(12) United States Patent
Nakase et al.

(10) Patent No.: US 6,411,374 B2
(45) Date of Patent: Jun. 25, 2002

(54) LIGHT-PROJECTING/RECEIVING UNIT AND OMNIDIRECTIONAL DISTANCE DETECTING APPARATUS

(75) Inventors: Shigeki Nakase; Takaaki Kawai; Hiromichi Tozuka; Michito Hirayanagi, all of Hamamatsu (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 0 days.

(21) Appl. No.: 09/863,292

(22) Filed: May 24, 2001

Related U.S. Application Data

(63) Continuation-in-part of application No. PCT/JP99/06520, filed on Nov. 22, 1999.

(30) Foreign Application Priority Data

Nov. 24, 1998 (JP) .......................................... 10-333072

(51) Int. Cl.$^7$ .......................... G01B 11/26; G01C 3/08; G02B 26/08; B60T 7/16
(52) U.S. Cl. ................... 356/141.1; 356/4.01; 359/226; 180/169
(58) Field of Search .............................. 356/141.1, 4.08, 356/5.01, 5.1; 359/226; 180/169

(56) References Cited

U.S. PATENT DOCUMENTS

| | | | |
|---|---|---|---|
| 3,551,050 A | * 12/1970 | Thorlin | |
| 4,215,273 A | * 7/1980 | Frosch et al. | |
| 4,978,862 A | * 12/1990 | Silva et al. | |
| 5,612,781 A | * 3/1997 | Ohtomo et al. | 356/152.2 |
| 5,689,328 A | * 11/1997 | Katayama | 356/4.01 |
| 5,742,384 A | * 4/1998 | Farmer | 356/141.4 |
| 5,808,727 A | 9/1998 | Katayama | 356/4.01 |

FOREIGN PATENT DOCUMENTS

| | | |
|---|---|---|
| JP | 1-502359 | 8/1989 |
| JP | 7-191142 | 7/1995 |
| JP | 10-010233 | 1/1998 |
| JP | 10-132934 | 5/1998 |
| WO | WO 87/07010 | 11/1987 |

* cited by examiner

Primary Examiner—Stephen C. Buczinski
(74) Attorney, Agent, or Firm—Morgan, Lewis & Bockius LLP

(57) ABSTRACT

A driving system region which is a region where a light projector, a light receiver, and a signal processing circuit are installed together is disposed on one side of an optical system region comprising a light-projecting region and a light-receiving region, so that wires such as their mutual signal lines are kept from passing through the optical system region, whereby an omnidirectional distance detecting apparatus capable of complete 360-degree omnidirectional distance detection can be obtained. The influence of electric noise caused by the driving system of rotary mechanism and the like upon light-receiving signals and the like is suppressed, whereby the accuracy in distance detection can be improved.

6 Claims, 5 Drawing Sheets

LIGHT-PROJECTING/RECEIVING UNIT AND OMNIDIRECTIONAL DISTANCE DETECTING APPARATUS

RELATED APPLICATION

This is a continuation-in-part application of application Ser. No. PCT/JP99/06520 filed on Nov. 22, 1999, now pending.

BACKGROUND OF THE INVENTION

1. Field of the Invention

The present invention relates to a light-projecting/receiving unit equipped with a scanning system; and, in particular, to an omnidirectional distance detecting apparatus, equipped with such a light-projecting/receiving unit, capable of detecting over 360 degrees therearound whether an object exists or not, the distance to the object, and the angle to the object.

2. Related Background Art

A distance detecting apparatus having a light projector using a laser, light-emitting diode, or the like for generating irradiation light to be emitted outside and a light receiver using a photodiode for detecting reflected light from an object and detects whether the object exists in a detecting direction or not and the distance to the object from the time difference between the light projection and light reception or the like has conventionally been known as a distance sensor system mounted in an automatic guided vehicle, for example.

The detecting direction in such an apparatus is the direction in which the irradiation light is projected outside and the reflected light from the outside is received. The detecting direction can be selected if the optical path of the irradiation light emitted from the light projector and the optical path of the reflected light made incident on the light receiver are changed to a predetermined direction by reflecting means such as a reflecting mirror which is optical path changing means. Here, the optical path changing means may be configured so as to be secured to and installed in a rotary mechanism which is rotatable by a predetermined rotary shaft, such that the detecting direction can be changed continuously, and the sidewall of surroundings of the optical path changing means being rotated may be configured optically open to the outside, such that the detecting direction can be rotated and changed substantially over 360 degrees therearound. As a consequence, an omnidirectional type distance detecting apparatus which can detect the distance to the object in all directions can be attained.

In an omnidirectional distance detecting apparatus such as the one mentioned above, the position of detected object can be specified if not only the distance to the object based on the light projection and reception but also the angle (direction) to the object is detected. Namely, while whether an object exists or not is detected according to whether reflected light is received from the object or not, if the reflected light is received, so that the object exists, then the distance to the object is detected according to the time difference between light projection and light reception or the like, and the angle to the object is detected by angle detection means, such as transmission type optical encoder, installed with respect to the rotary mechanism such that the angle of rotation in the detecting direction can be measured. Examples of such apparatus include those disclosed in Japanese Patent Application Laid-Open No. HEI 7-191142 and No. HEI 10-10233.

SUMMARY OF THE INVENTION

In the above-mentioned conventional omnidirectional distance detecting apparatus, while the optical path changing means is fixed onto a rotary shaft, the light projector and light receiver are disposed opposite each other on the rotary shaft so as to face their respective predetermined reflecting surfaces of the optical path changing means. Namely, the light projector is disposed at one end part of the rotary shaft, so as to emit irradiation light along the rotary shaft, and the optical path thereof is changed by optical path changing means, such as light projection mirror, to a detecting direction which is perpendicular to the rotary shaft, so that the light is emitted outside. On the other hand, the light receiver is disposed at the other end part of the rotary shaft, such that the optical path of the reflected light from the object incident in the detecting direction is changed by optical path changing means, such as light-receiving mirror, to a direction extending along the rotary shaft, whereby the light is incident on the light receiver.

Thus configured apparatus has been problematic in that, since the light projector and light receiver are installed at substantially both ends of the rotary shaft, i.e., both ends of the apparatus, a wire such as signal line becomes longer and limits the degree of freedom in designing the rotary mechanism and the like. Also, since this line is required to pass through a region where the projection of irradiation light to the outside and the reception of reflected light from the outside are carried out, complete 360-degree omnidirectional distance detection has been impossible. Further, such a longwire enhances the influence of electric noise from the rotary driving system of rotary mechanism and the like, thereby causing the accuracy of distance detection to deteriorate.

In view of the problems mentioned above, it is an object of the present invention to provide an omnidirectional distance detecting apparatus which enables distance detection over 360 degrees with a high accuracy.

For achieving such an object, the present invention provides an omnidirectional distance detecting apparatus, comprising a light projector and a light receiver within a housing, for emitting irradiation light from the light projector to a predetermined detecting direction outside the housing by way of projecting light optical path changing means and causing reflected light from an object in the detecting direction to be made incident on the light receiver by way of receiving light optical path changing means, so as to detect whether the object exists or not and a distance to the object; the apparatus comprising a rotary mechanism having a rotating part installed so as to be rotatable about a predetermined axis within the housing as an axis of rotation and a rotary driving part for driving the rotating part, the projecting light optical path changing means and receiving light optical path changing means being secured and installed on the axis of rotation; angle detection means for detecting an angle of rotation of the rotating part; and a signal processing circuit for detecting the distance to the object according to a signal from the light projector and light receiver and an angle to the object according to a signal from the angle detection means; a region within the housing being divided along the direction of axis of rotation into an optical system region and a driving system region within which the light projector, light receiver, and signal processing circuit are disposed, a side wall of the optical system region being constituted by a transparent tube transparent to light; the optical system region being further divided along the direction of axis of rotation into a light-projecting region, including the projecting light optical path changing means therein, for emitting the irradiation light into the detecting direction; and a light-receiving region adjacent the driving system region, including the receiving light optical path changing means therein, for receiving the reflected light from the detecting direction; the light-projecting region and light-receiving region being optically separated from each other by light-shielding means, installed so as to be fixed with respect to the transparent tube, for blocking stray light deviating from an optical path; the light receiver having irradiation light guiding means, disposed on the axis of rotation so as to oppose the receiving light optical path changing means and installed within the light-projecting region, for guiding the irradiation light from the light projector to the projecting light optical path changing means.

The present invention also provides an omnidirectional distance detecting apparatus, comprising a light projector and a light receiver within a housing, for emitting irradiation light from the light projector to a predetermined detecting direction outside the housing by way of projecting light optical path changing means and causing reflected light from an object in the detecting direction to be made incident on the light receiver by way of receiving light optical path changing means, so as to detect whether the object exists or not and a distance to the object; the apparatus comprising a rotary mechanism having a rotating part installed so as to be rotatable about a predetermined axis within the housing as an axis of rotation and a rotary driving part for driving the rotating part, the projecting light optical path changing means and receiving light optical path changing means being secured and installed on the axis of rotation; angle detection means for detecting an angle of rotation of the rotating part; and a signal processing circuit for detecting the distance to the object according to a signal from the light projector and light receiver and an angle to the object according to a signal from the angle detection means; a region within the housing being divided along the direction of axis of rotation into an optical system region and a driving system region within which the light projector, light receiver, and signal processing circuit are disposed, a side wall of the optical system region being constituted by a transparent tube transparent to light; the optical system region being further divided along the direction of axis of rotation into a light-projecting region adjacent the driving system region, including the projecting light optical path changing means therein, for emitting the irradiation light into the detecting direction; and a light-receiving region, including the receiving light optical path changing means therein, for receiving the reflected light from the detecting direction; the light-projecting region and light-receiving region being optically separated from each other by light-shielding means, installed so as to be fixed with respect to the transparent tube, for blocking stray light deviating from an optical path; the light projector being disposed on the axis of rotation so as to oppose the projecting light optical path changing means; the omnidirectional distance detecting apparatus having reflected light guiding means, installed within the light-receiving region, for guiding the reflected light from the receiving light optical path changing means to the light receiver.

In the configurations mentioned above, both the light projector and light receiver are installed in the driving system region located on the same side of the projecting light optical path changing means and receiving light optical path changing means, which are optical path changing means, with respect to the direction along the axis of rotation of the rotary mechanism. As a consequence, wires such as signal lines within the optical system region including the light-projecting region and light-receiving region can be eliminated, so as to enable complete 360-degree omnidirectional distance detection, and the degree of freedom in design and the like are secured so as to enhance the functionality of apparatus, whereas the wiring to the signal processing circuit can be shortened, so as to reduce the influence of electric noise on light-receiving signals and the like, thereby restraining the accuracy in distance detection from deteriorating.

In such an apparatus configuration, it is necessary that at least one of light projector and light receiver be disposed at a position deviating from the axis of rotation of the rotary mechanism. In this case, it is necessary to provide irradiation light guiding means for guiding the irradiation light from the light projector or reflected light guiding means for guiding the reflected light to the light receiver.

Namely, while the light projector is disposed at a position deviating from the axis of rotation in the case where the light receiver is disposed on the axis of rotation, light can be projected and received in a configuration comprising irradiation light guiding means, such as reflecting prism, for guiding the irradiation light from the light projector to the projecting light optical path changing means as mentioned above.

In the case where the light receiver is disposed at a position deviating from the axis of rotation while the light projector is disposed on the axis of rotation, light can be projected and received in a configuration comprising reflected light guiding means, such as reflecting prism, for guiding the reflected light from the receiving light optical path changing means to the light receiver.

The angle detection means may comprise an angle detection disk, secured to an outer periphery of the rotating part, having an angle detection slit group constituted by a plurality of slits disposed at equally spaced intervals on a predetermined circle centered at the axis of rotation; a photoelectric unit for photoelectrically detecting passage through the slits; a clock circuit for generating an electric signal in a high-speed pulse form having a predetermined frequency; and angle calculating means for calculating the angle to the object by using the detection of slits obtained by the photoelectric unit and the number of pulses of electric signal caused by the clock circuit.

Though the angle to the object can be detected by a transmission type optical encoder having a disk and a photoelectric unit in an apparatus such as the one mentioned above, the angular resolution is determined by the slit arrangement interval in the angle detection slit group, whereby the angle cannot be detected with a high resolution in this case. If angle detection by means of an electric signal with a high-speed pulse is employed together therewith, by contrast, then angle can be detected with a high resolution without changing the slit arrangement interval.

Though both the light projector and light receiver are installed in the driving system region located on the same side of the projecting light optical path changing means and receiving light optical path changing means, which are optical path changing means, with respect to the direction along the axis of rotation of the rotary mechanism, whereby wires such as signal lines within the optical system region including the light-projecting region and light-receiving region are eliminated, so as to enable complete 360-degree omnidirectional distance detection in the above-mentioned apparatus, an optical axis structure in which the light exit position and light entrance position coincide with each other may be considered in the light souce and photodetector employed in the omnidirectional distance detecting apparatus.

If a drop of water or the like attaches onto the light exit position of the transparent tube in such a case, however, then diffuse reflection may also occur at the time when light is incident thereon, thereby enhancing the error in detection. For suppressing such an error in detection, the present invention provides a light-projecting/receiving unit for emitting light outside from within a transparent tube by way of a light exit position on the transparent tube, and causing a reflected part of the light from the outside to enter the transmission tube byway of a light entrance position on the transparent tube; wherein the light-projecting/receiving unit comprises a light source and a photodetector which are disposed so as to correspond to the light exit and light entrance positions, respectively, such that the light exit and light entrance positions are positions different from each other on the transparent tube; a light-shielding barrier provided in the transparent tube so as to separate the light exit and light entrance positions from each other; and a scanning optical system, disposed on a path of the light emitted from the light source and on a path of the light incident on the photodetector, for moving the light exit and light entrance positions.

Here, the transparent tube is a tube transparent to the light emitted from the light source and the light incident on the photodetector, and refers to a tube transparent in the visible range when these kinds of light are visible light, though it may be opaque in the visible range as long as it is transparent in the infrared range if these kinds of light are infrared rays, for example.

While the light exit and entrance positions are scanned with the scanning optical system in this unit, even when a drop of water or the like is attached to the transparent tube, its diffuse reflection can be suppressed, and the light-shielding barrier suppresses the diffuse reflection occurring at one of the positions, whereby optical scanning can be carried out with a high accuracy.

Preferably, the scanning optical system comprises first and second reflecting surfaces for reflecting the light from the light source to the light exit position and the light from the light entrance position to the photodetector, respectively, whereas the first and second reflecting surfaces are disposed on the center axis of the transparent tube and rotate about the center axis. Since the center axis becomes the center of rotation, this scanning optical system can carry out scanning without deflecting the optical path between each of light source and photodetector and its corresponding reflecting surface.

DESCRIPTION OF THE PREFFERED EMBODIMENT

In the following, preferred embodiments of the omnidirectional distance detecting apparatus in accordance with the present invention will be explained in detail with reference to the drawings. In the explanation of drawings, constituents identical to each other will be referred to with numerals or letters identical to each other, without repeating their overlapping descriptions.

Figure 1:
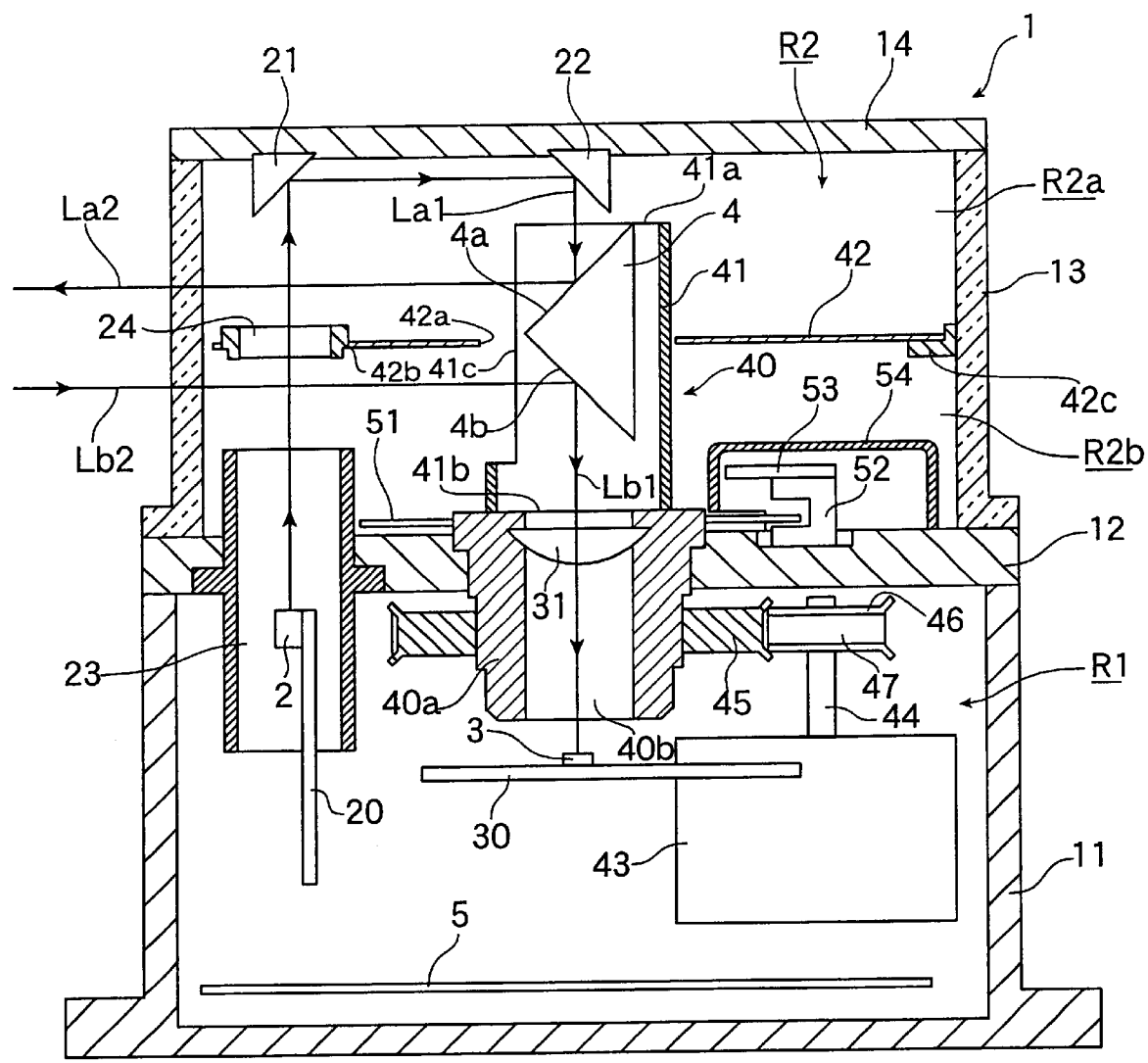
FIG. 1 is a sectional view showing the configuration of a first embodiment of the omnidirectional distance detecting apparatus.
Figure 2:
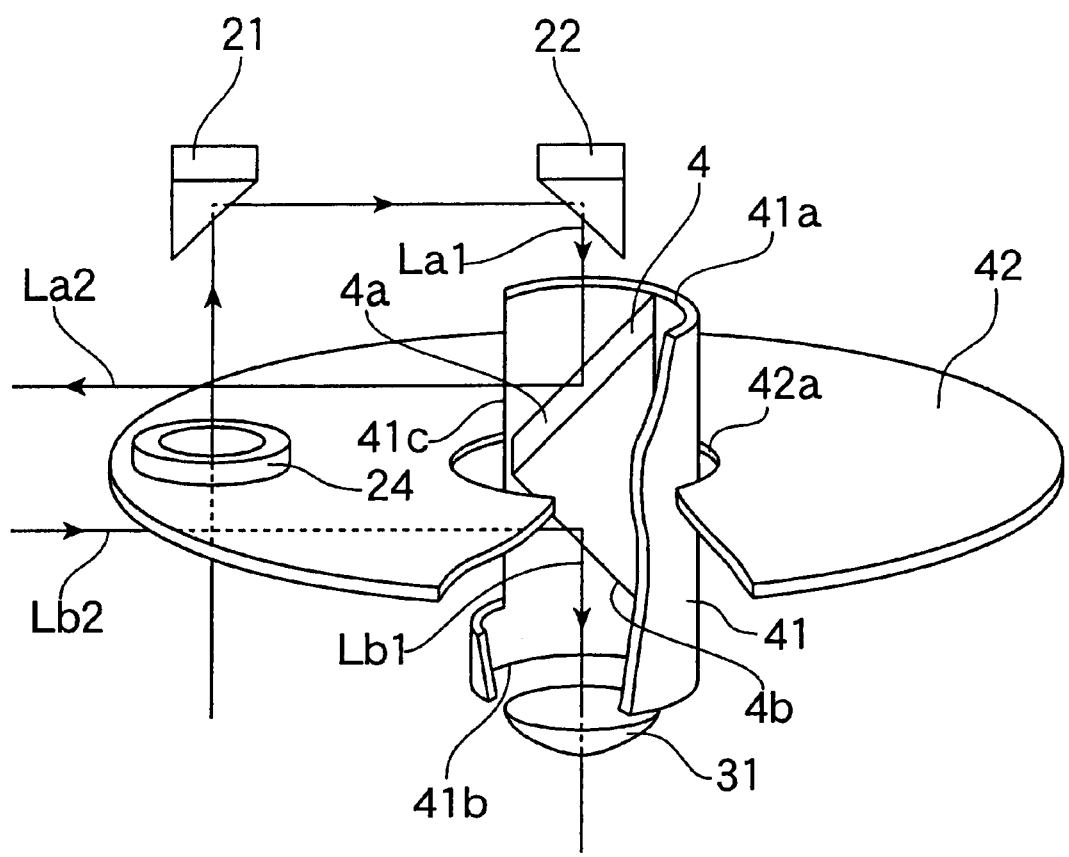
FIG. 2 is a perspective view schematically showing the optical system of the omnidirectional distance detecting apparatus shown in FIG. 1.

FIG. 1 is a sectional view showing the configuration of a first embodiment of the omnidirectional distance detecting apparatus in accordance with the present invention. FIG. 2 is a perspective view schematically showing the constituents and optical paths of the optical system in this embodiment. Here, FIG. 2 shows a rotary cylinder 41 and a light-shielding plate 42, which will be explained later, in a partly broken state.

The housing 1 in this embodiment is constituted by a driving system cover 11, a partition plate 12, a transparent cylinder 13, and an optical system cover 14. The inner region of the housing 1 is divided by the partition plate 12 into a driving system region R1 on the lower side having the driving system cover 11 as a side wall; and an optical system region R2 on the upper side, optically open to the outside, having the transparent cylinder 13 as a side wall.

A rotating part 40 driven to rotate about the vertical direction, as its axis of rotation, is installed at and connected to the center portion of the partition plate 12 so as to be rotatable with respect to the partition plate 12. A rotary support portion 40a, connected to the partition plate 12, constituting the lower portion of the rotating part 40, is provided with a disk-shaped rotary ring 45 at a predetermined location of its outer periphery positioned within the driving system region R1. On the other hand, by way of a rotary driving shaft 44, a rotary ring 46 is attached to a rotary driving part 43, having a motor for driving the rotating part 40, installed at a predetermined position deviating from the axis of rotation within the driving system region R1. As the rotary rings 45 and 46 are connected to each other by means of a rotary belt 47, a rotary mechanism is constructed, whereby the rotating part 40 is driven to rotate and controlled by the rotary driving part 43. Here, the inside of the rotary support portion 40a is formed with a cylindrical light-guiding path 40b having a predetermined inside diameter.

The upper side of the rotating part 40 positioned within the optical system region R2 is constituted by the rotary cylinder 41. Within the rotary cylinder 41, an optical path changing prism 4, which is optical path changing means, is installed so as to be fixed with respect to the rotary cylinder 41. The optical path changing prism 4 has a shape which is obtained when the upper and lower end faces of a quadrangular prism disposed with its center axis coinciding with the axis of rotation of the rotating part 40 are cut off at an angle of 45 degrees.

In these two cut faces, the upper and lower cut faces constitute a projecting light reflecting surface 4a, which is projecting light optical path changing means, and a receiving light reflecting surface 4b, which is receiving light optical path changing means, respectively, thereby determining the main optical path system for projecting and receiving light in this embodiment. Namely, the optical system region R2 is partitioned by a horizontal plane sandwiched between the projecting light reflecting surface 4a and receiving light reflecting surface 4b of the optical path changing prism 4, as the boundary surface, into a light-projecting region R2a on the upper side and a light-receiving region R2b on the lower side.

The light-projecting region R2a includes the projecting light reflecting surface 4a, whereby the irradiation light to the object is made incident on the projecting light reflecting surface 4a by way of a projecting light entrance optical path La1 vertically extending thereto from thereabove along the axis of rotation of the rotating part 40 and, with its optical path changed thereby, is guided to a projection light exit optical path La2. On the other hand, the light-receiving region R2b includes the receiving light reflecting surface 4b, whereby the reflected light from the object is made incident on the receiving light reflecting surface 4b by way of a receiving light entrance optical path Lb2 and, with its optical path changed thereby, is guided to a receiving light exit optical path Lb1 vertically extending downward therefrom along the axis of rotation.

Here, the projecting light exit optical path La2 and the receiving light entrance optical path Lb2 are horizontal and parallel to each other, whereby the reflected light from the object due to the irradiation light from the projecting light exit optical path La2 can be taken from the receiving light entrance optical path Lb2.

The upper and lower ends of the rotary cylinder 41 are an upper end opening portion 41a through which the projecting light entrance optical path La1 passes and a lower end opening portion 41b through which the receiving light exit optical path Lb1 passes, respectively, whereas a predetermined region of the rotary cylinder 41 including its intersections with the projecting light exit optical path La2 and receiving light entrance optical path Lb2 is formed with a side face opening portion 41c. Installed at the upper end opening portion 41a, lower end opening portion 41b, and side face opening portion 41c are light-transmitting windows (not depicted) each formed by a transparent member transmitting light therethrough. These portions may also be placed in an open state without installing light-transmitting windows.

The side wall of the optical system region R2, constituted by the light-projecting region R2a and light-receiving region R2b, through which the projecting light exit optical path La2 and the receiving light entrance optical path Lb2 pass, is the transparent cylinder 13 transmitting light therethrough. Here, since each optical path rotates over 360 degrees, the sidewall is made optically open by the transparent cylinder 13 in all directions of 360 degrees, unlike the side face opening portion 41c formed in a part of the region of the rotary cylinder 41 rotating together with the optical paths. In this embodiment, the center axis of the transparent cylinder 13 coincides with the axis of rotation of the rotating part 40.

Also employable as the optical path changing prism 4 are other shapes, such as one obtained when the upper and lower end faces of a cylindrical form disposed with its center axis coinciding with the axis of rotation are cut off at an angle of 45 degrees, for example. Reflecting mirrors and the like, formed separately from each other, may also be used as the projecting light optical path changing means and receiving light optical path changing means, respectively.

Installed at the boundary surface between the light-projecting region R2a and the light-receiving region R2b is the disk-shaped light-shielding plate 42 having a center opening portion 42a through which the rotary cylinder 41 penetrates. The light-shielding plate 42 is secured, at a plurality of positions (among which one is depicted in FIG. 1) in the outer peripheral part thereof by a light-shielding plate securing part 42c, to the transparent cylinder 13. As a consequence, stray light, which is scattered/reflected part of irradiation light due to dirt, droplets of water, and the like attached to the inner wall of the housing 11 and transparent cylinder 13, can be prevented from entering the light-receiving region R2b, whereby the accuracy in distance detection can be restrained from decreasing.

The projection of irradiation light and reception of reflected light in this apparatus are carried out by a light projector 2, which is preferably a semiconductor laser, and a light receiver 3, which is preferably a semiconductor photodetector. Each of the light projector 2 and light receiver 3 is installed within the driving system region R1. In such a configuration, since both of the light projector 2 and light receiver 3 are disposed lower than the optical system region R2 and, in particular, are disposed (on the same side) lower than the boundary surface between the light-projecting region R2a and the light-receiving region R2b where the light-shielding plate 42 is installed, at least one of the light projector 2 and light receiver 3 is required to be disposed at a position deviating from the axis of rotation of the rotating part 40.

In this embodiment, the light-receiving region R2b is adjacent the driving system region R1, whereas the light projector 2 is installed, at a predetermined position deviating from the axis of rotation, with its light exit axis extending vertically upward therefrom. A light-guiding part 23 is installed at the location of partition plate 12 opposite the light projector 2. The light-shielding plate 42 is provided with an opening portion 42b at the location opposite the light projector 2, whereby the irradiation light emitted vertically upward from the light projector 2 passes through the light-guiding part 23, light-receiving region R2b, and opening portion 42b, so as to enter the light-projecting region R2a. For preventing the scattered light from each location on the light-projecting region R2a and the like from entering the light-receiving region R2b side by way of the opening portion 42b, a scattering light restriction ring 24 thicker than the light-shielding plate 42 is installed at the opening portion 42b.

As mentioned above, the irradiation light emitted vertically upward from the light projector 2 located at a position deviating from the axis of rotation is reflected by prisms 21 and 22, which are irradiation light guiding means secured to the lower face side of the optical system cover 14 forming the upper end of the light-projecting region R2a, and its optical path is changed to the projecting light entrance optical path La1 directed vertically downward along the axis of rotation, so as to be made incident on the projecting light reflecting surface 4a.

On the other hand, the light receiver 3 is installed on the axis of rotation, whereby the reflected light whose optical path is changed to the receiving light exit optical path Lb1 by means of the receiving light reflecting surface 4b is made incident on the light receiver 3 by way of a light-receiving lens 31. Also, for projecting the irradiation light, a light-projecting lens may be installed within the light-guiding part 23, for example.

The light projection and light reception of the light projector 2 and light receiver 3 are driven and controlled by a light projection control circuit 20 and a light reception control circuit 30, respectively. The light projector 2 and light receiver 3 are further connected to a signal processing circuit 5 (though no connecting wires are depicted). As a consequence, driving signals of the light projector 2 and light-receiving signals of the light receiver 3 are fed into the signal processing circuit 5, whereby the signal processing circuit 5 calculates and determines whether an object exists or not in the detecting direction according to whether light is received or not, and the distance to the object according to the time difference between the light projection and light reception or the like.

In the conventional omnidirectional distance detecting apparatus, the light projector and light receiver are disposed opposite each other on the rotary shaft on the light-projecting region side and light-receiving region side with respect to the optical path changing means, respectively. This case has been problematic in that, since the light projector and light receiver are installed at substantially both ends of the rotary shaft, i.e., both ends of the apparatus, a wire such as signal line becomes longer, thereby limiting the rotary driving, and the long wiring causes electric noise from the rotary driving system or the like to be more influential.

In the apparatus in accordance with the present invention, by contrast, the driving system region R1 is disposed on one of the light-projecting region R2a side or light-receiving region R2b side (on the light-receiving region R2b side in the embodiment shown in FIG. 1), so that the light projector 2, the light receiver 3, and the signal processing circuit 5 inputting therein the signals from the light projector 2 and light receiver 3 are installed within the driving system region R1, separately from the optical system region R2 constituted by the light-projecting region R2a and light-receiving region R2b. As a consequence, their mutual wiring is made shorter, so as to secure the degree of freedom in designing the apparatus, and no wires are disposed within the optical system region R2, whereby complete 360-degree omnidirectional distance detection becomes possible. Further, shortening the wiring as such can realize an omnidirectional distance detecting apparatus in which the influence of electric noise on the light-receiving signal or the like is suppressed, so as to improve the accuracy in distance detection. Also, disposing the light projector 2 and light receiver 3 in the same region as such can make the apparatus smaller.

Further, in the case where the driving system region R1 in which the light projector 2, light receiver 3, rotary driving part 43, and the like are installed is positioned in the lower part of the apparatus as shown in this embodiment, the weight of the part of apparatus supported by the transparent cylinder 13, which is the sidewall of the optical system region R2, is reduced, whereby a sufficient strength can be obtained even when the transparent cylinder 13 is made thinner. As a consequence, at the time when the irradiation light is emitted through the projecting light exit optical path La2 and the reflected light is made incident through the receiving light entrance optical path Lb2, the reduction of the quantity of transmitted light and the distortion of images can be suppressed, whereby distance detection can be carried out at a higher accuracy.

In this apparatus, the light-shielding plate 42 is secured with respect to the transparent cylinder 13, which is the side wall of the housing 1. The case where the light-shielding means for separating the light-projecting region and light-receiving region from each other is secured with respect to the rotating part attains a structure in which the light-shielding means is also rotated, whereby the load of rotary driving increases. In a structure in which the light-shielding plate 42 is secured with respect to the housing 1, by contrast, the functionality of rotary driving can be made higher. Such a fixed arrangement of the light-shielding plate 42 can be attained when the light projector 2, light receiver 3, prisms 21, 22, and the like are disposed fixedly. At the same time, their fixed arrangement can facilitate optical axis adjustment and the like in the apparatus.

Also, since the light-projecting region R2a and the light-receiving region R2b are adjacent each other by way of the light-shielding plate 42 alone, the light-receiving efficiency is restrained from decreasing due to deviations from an expected light-receiving angle even in short-distance measurement.

The angle detection means and its detection of the angle to an object in this apparatus will now be explained. An encoder disk 51 is attached to the rotary support portion 40a at a location positioned within the optical system region R2, whereas a photoelectric unit 52 is installed at a predetermined position on the outer periphery of the encoder disk 51 as being secured to the partition plate 12 so as to hold a part of the outer periphery of encoder disk 51. The encoder disk 51, the photoelectric unit 52, and an encoder control circuit 53 for controlling them constitute a transmission type optical encoder for angle detection.

The encoder disk 51 is formed with an angle detection slit group composed of a plurality of slits disposed at predetermined angular intervals on a predetermined circle centered at the axis of rotation of the rotating part 40 and located within a region passing the inside of the photoelectric unit 52 upon rotation. Similarly, a reference angle detection slit is formed on a circle, concentric with and different from the circle provided with the above-mentioned angle detection slit group, within a region passing the inside of the photoelectric unit 52 upon rotation. The reference angle detection slit is provided for determining an angular position which becomes a base point for the angle detection by the angle detection slit group, and is constituted by either a single slit or a plurality of slits such as two slits at intervals of 180 degrees or four slits at intervals of 90 degrees depending on various conditions such as the rotating speed of the rotating part 40.

In the photoelectric unit 52, a light source is disposed on one side of the encoder disk 51, whereas a photodetector is disposed on the other side, so that the light from the light source transmitted through the individual slits of the angle detection slit group and reference angle detection slit can be detected by the photodetector, whereby angular information can be obtained. For carrying out such angle detection based on light, a light-shielding case 54 is installed so as to surround a region including the photoelectric unit 52.

The signal from the transmission type optical encoder is fed into the signal processing circuit 5, where the angle to the object is calculated. The photoelectric unit 52 and the like are installed adjacent the driving system region R1 in this case as well, whereby all the wiring of their signal lines and the like is effected within the driving system region R1. Consequently, as with the signal lines concerning distance detection, the signal lines concerning angle detection can be made shorter, so as to reduce the deterioration of resolution caused by the influence of electric noise. Though not depicted, a wiring path for wiring signal lines from the transmission type optical encoder is disposed at a predetermined location within the region of partition plate 12 covered with the light-shielding case 54.

In the case where a transmission type optical encoder such as the one mentioned above is used, the resolution of angle detection is determined by the slit arrangement interval in the angle detection slit group. Though it is necessary for the slit arrangement interval to be made smaller in order to carry out angle detection at a higher resolution, there is a maximum limit on the density at which the slits are disposed; and the apparatus itself becomes greater if the diameter of encoder disk 51 is made larger. Hence, the inventors have employed an angle detection method which enhances the angular resolution by using the angle detection by the transmission type optical encoder and the detection by an electric clock together (e.g., Japanese Patent Application Laid-Open No. HEI 5-60575).

Figure 3:
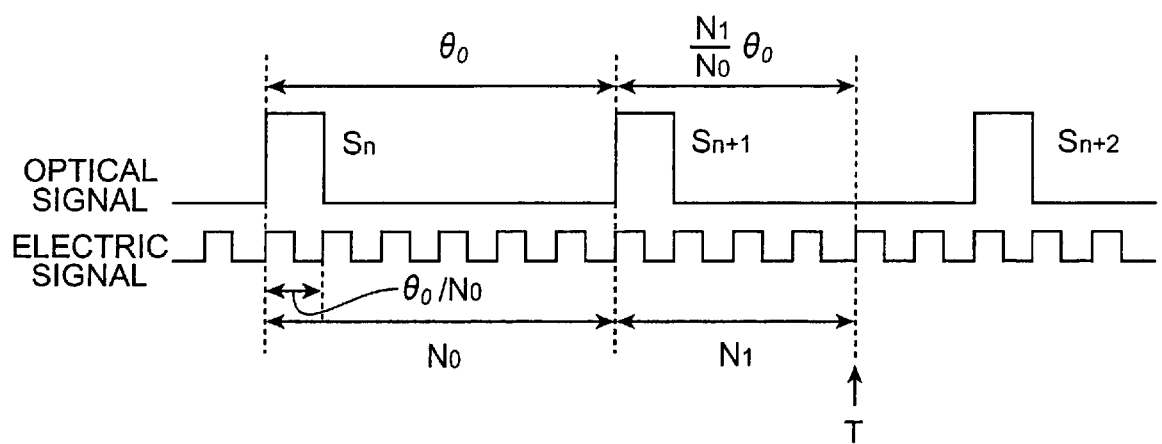
FIG. 3 is a timing chart for explaining a method of detecting the angle to an object by the omnidirectional distance detecting apparatus shown in FIG. 1.

FIG. 3 is a timing chart for explaining the above-mentioned angle detection method, illustrating the optical signal corresponding to the angle detection slit group and the electric signal based on a predetermined frequency used for angle detection together therewith. In this embodiment, the signal processing circuit 5 includes a clock circuit for generating an electric signal in a high-speed pulse form having a predetermined frequency, and angle calculating means for calculating the angle to the object by using this electric signal as well. The frequency of the electric signal generated by the clock circuit is set such that its signal pulse interval becomes smaller than the signal pulse interval of optical signal determined by the slit arrangement interval in the angle detection slit group and the rotation speed of rotating part 40. Also, for example, the signal pulse $S_n$ in the optical signal indicates the signal pulse caused by the n-th slit from the reference angle detected by the reference angle detection slit, and corresponds to an angle $n\theta_0$ when the slit arrangement interval in the angle detection slit group is $\theta_0$.

Assuming that the rotating part 40 rotates at a constant speed, the number of electric signal pulses between two signal pulses S corresponding to respective adjacent slits is constant. This number is determined as $N_0$ between the signal pulses $S_n$ and $S_{n+1}$, for example, upon measurement. Here, the angular interval per electric signal pulse is $\theta_0/N_0$, which enables measurement at a high resolution with its angular resolution being set to the angular interval $\theta_0/N_0$. Namely, assuming that, by way of example, the reflected light from an object is received at a timing T, while the number of electric signal pulses from the signal pulse $S_{n+1}$ at that time is $N_1$, the angle to the detected object is determined as $(n+1+N_1/N_0)\theta_0$.

In particular, employing such an angle detecting method using electric signal pulses as well enables measurement with an angular resolution higher than the value corresponding to the slit arrangement interval as mentioned above. Also, if the frequency of electric signal pulse is changed, then the resolution of angle detection can be altered without changing the slit arrangement interval.

Without being restricted to the above-mentioned embodiment, the omnidirectional distance detecting apparatus in accordance with the present invention can be modified in various manners.

Figure 4:
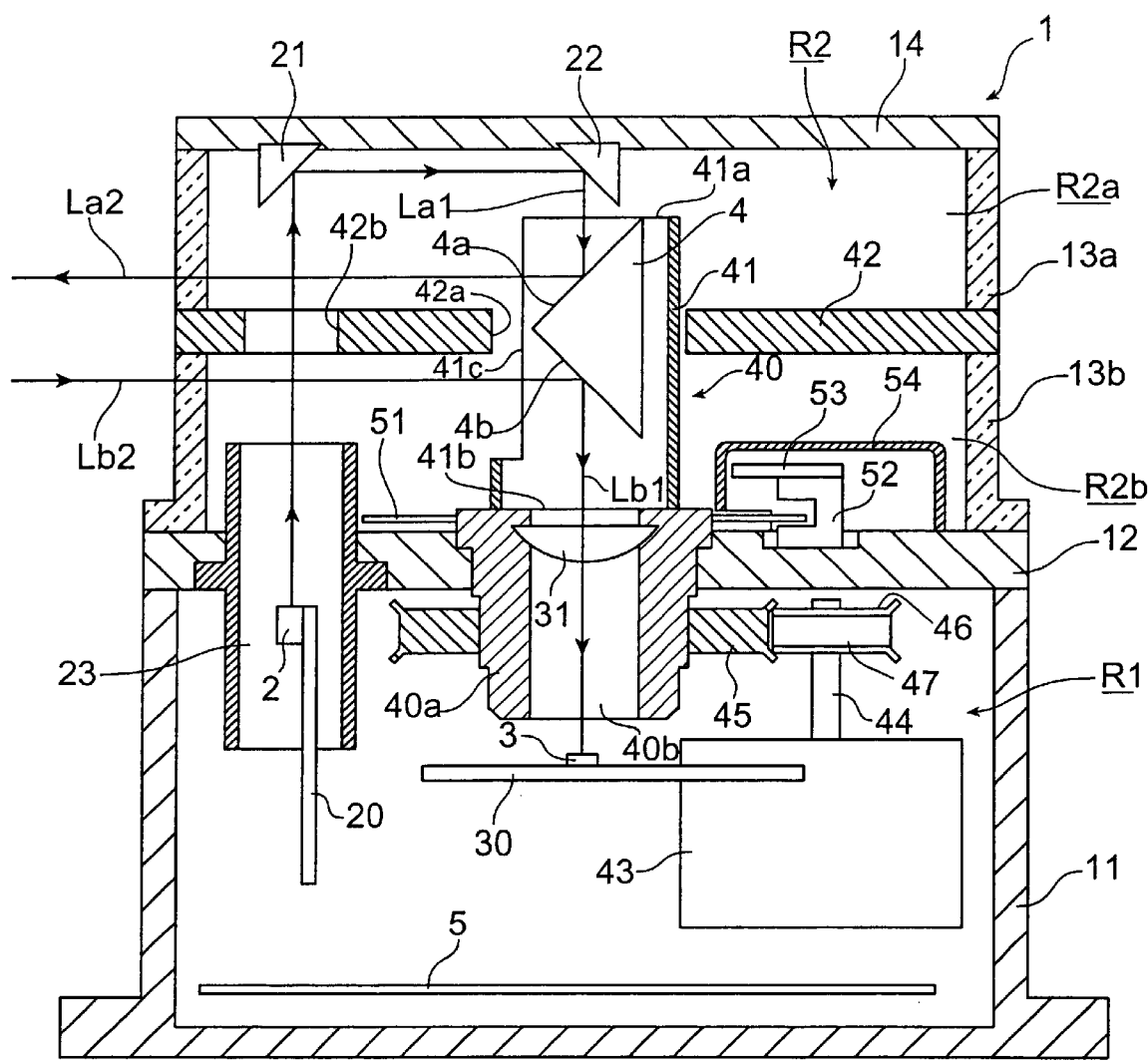
FIG. 4 is a sectional view showing the configuration of a second embodiment of the omnidirectional distance detecting apparatus.

FIG. 4 is a sectional view showing the configuration of a second embodiment of the omnidirectional distance detecting apparatus in accordance with the present invention. In this embodiment, the transparent cylinder acting as the side wall of the optical system region R2 is constituted by two transparent cylinders, i.e., a transparent cylinder 13a which is the side wall of the light-projecting region R2a and a transparent cylinder 13b which is the side wall of the light-receiving region R2b, whereas the light-shielding plate 42 is installed between the transparent cylinders 13a and 13b. Such a configuration can also yield effects similar to those of the first embodiment. In this embodiment, the light-shielding plate 42 is made thicker than that in the first embodiment, whereby no scattering light restriction ring is installed in the opening portion 42b.

Figure 5:
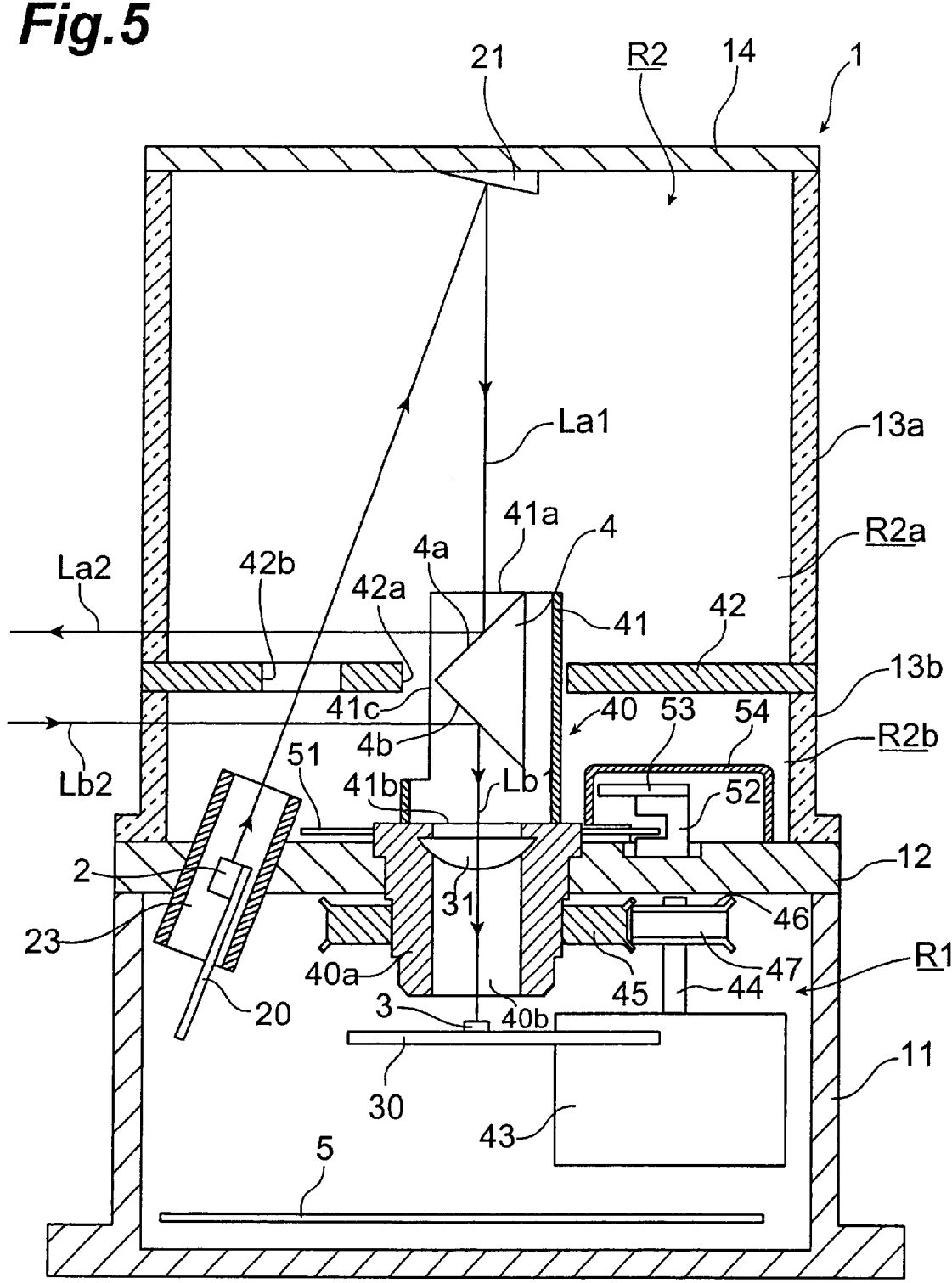
FIG. 5 is a sectional view showing the configuration of a third embodiment of the omnidirectional distance detecting apparatus.

FIG. 5 is a sectional view showing the configuration of a third embodiment of the omnidirectional distance detecting apparatus in accordance with the present invention. In this embodiment, the light projector 2 and light-guiding part 23 are installed as being inclined with respect to the vertical axis at a predetermined angle, whereby the irradiation light is guided while a single prism 21 secured to the optical system cover 14 is used as irradiation light guiding means. In this case, optical axis adjustment is simplified due to the fact that the prism 21 is single.

Though the light receiver is disposed on the axis of rotation of rotary mechanism in all of the above-mentioned first to third embodiments, the optical system region may be divided such that the light-projecting region, to the contrary, is placed adjacent the driving system region, whereas the light projector is disposed on the axis of rotation so as to face the projecting light optical path changing means. Here, the light receiver is disposed at a position deviating from the axis of rotation, whereas reflected light guiding means comprising a single reflecting prism, a plurality of reflecting prisms, or the like for guiding reflected light from the receiving light optical path changing means toward the light receiver is provided, so as to project and receive light. In this case, since the reflected light has a spot diameter greater than that of irradiation light, the optical axis adjustment in the light guiding means is relatively easy. Also, the opening portion on the light-shielding plate for passing the reflected light therethrough is required to be made larger than that in the case with irradiation light, in order to fully take reflected light therein.

As explained in detail in the foregoing, the above-mentioned omnidirectional distance detecting apparatus yields effects as follows. Namely, since it is configured such that a driving region, which is a region where a light projector, a light receiver, and a signal processing circuit are installed together, is provided on one side of an optical system region comprising a light-projecting region and a light-receiving region, wires such as signal lines therebetween are kept from passing through the optical system region, whereby an omnidirectional distance detecting apparatus capable of complete 360-degree omnidirectional distance detection can be attained. Here, the cylinder 13 may be a polygonal tube.

Also, since the wiring distance is shortened thereby, the influence of electric noise caused by the driving system of rotary mechanism and the like upon light-receiving signals and the like is suppressed, whereby the accuracy in distance detection can be improved.

Here, though both the light projector and light receiver are installed in the driving system region located on the same side of the projecting light optical path changing means and receiving light optical path changing means, which are optical path changing means, with respect to the direction along the axis of rotation of rotary mechanism in the apparatus, so as to eliminate wires such as signal lines in the optical system region including the light-projecting region and light-receiving region, thereby enabling complete 360-degree omnidirectional distance detection, the light source and photodetector used in an omnidirectional distance detecting apparatus may employ an optical axis structure in which the light exit and entrance positions coincide with each other.

If a drop of water or the like attaches to the transparent cylinder at the light exit position thereof in such a case, however, then diffuse reflection also occurs at the time of incidence of light, thereby enhancing the error in detection. The above-mentioned omnidirectional distance detecting apparatus is equipped with a light-projecting unit, which suppresses such a detection error. Namely, the light-projecting/receiving unit for emitting light La2 outside from within a transparent tube 13 (13a, 13b) by way of a light exit position on the transparent tube 13 and causing a reflected part Lb2 of the light from the outside to enter the transmission tube 13 by way of a light entrance position on the transparent tube 13 comprises a light source 2 and a photodetector 3 which are disposed so as to correspond to the light exit and light entrance positions, respectively, such that the light exit and light entrance positions are positions different from each other on the transparent tube; a light-shielding barrier 42 provided in the transparent tube so as to separate the light exit and light entrance positions from each other; and a scanning optical system 4, disposed on the path La of the light emitted from the light source 2 and on the path Lb2 of the light incident on the photodetector 3, for moving the light exit and light entrance positions.

Here, the transparent tube 13 is a tube transparent to the light emitted from the light source 2 and the light incident on the photodetector 3, and refers to a tube transparent in the visible range when these kinds of light are visible light, though it may be opaque in the visible range as long as it is transparent in the infrared range if these kinds of light are infrared rays, for example.

While the light exit and entrance positions are scanned with the scanning optical system 4 in this unit, even when a drop of water or the like is attached to the transparent tube 13, the resulting diffuse reflection can be suppressed, and the light-shielding barrier 42 suppresses the diffuse reflection occurring at one of the positions, whereby optical scanning can be carried out with a high accuracy.

The scanning optical system 4 comprises first and second reflecting surfaces 4a, 4b for reflecting the light from the light source 2 to the light exit position and the light from the light entrance position to the photodetector 3, respectively, whereas the first and second reflecting surfaces 4a, 4b are disposed on the center axis of the transparent tube 13 and rotate about the center axis. Since the center axis becomes the center of rotation, this scanning optical system 4 can carry out scanning without deflecting the optical path between each device 2, 3 and its corresponding reflecting surface 4a, 4b.

Industrial Applicability

The present invention can be utilized in light-projecting/receiving units and omnidirectional distance detecting apparatus.

What is claimed is:

1. A light-projecting/receiving unit for emitting light outside from within a transparent tube by way of a light exit position on said transparent tube, and causing a reflected part of said light from the outside to enter said transmission tube by way of a light entrance position on said transparent tube, said light-projecting/receiving unit comprising:
 a light source and a photodetector which are disposed so as to correspond to said light exit and light entrance positions, respectively, such that said light exit and light entrance positions are positions different from each other on said transparent tube;
 a light-shielding barrier provided in said transparent tube so as to separate said light exit and light entrance positions from each other; and
 a scanning optical system, disposed on a path of the light emitted from said light source and on a path of the light incident on said photodetector, for moving said light exit and light entrance positions,
wherein both of said light source and said photodetector are disposed on one face side of said light-shielding barrier, said scanning optical system is disposed on the other face side of said light-shielding barrier, the light emitted from said light source is guided to said scanning optical system by way of an opening portion provided in said light-shielding barrier, and the light from said scanning optical system is guided to said photodetector.

2. A light-projecting/receiving unit according to claim 1, wherein said scanning optical system comprises first and second reflecting surfaces for reflecting the light from said light source to said light exit position and the light from said light entrance position to said photodetector, respectively, said first and second reflecting surfaces being disposed on a center axis of said transparent tube and rotating about said center axis.

3. An omnidirectional distance detecting apparatus, comprising a light projector and a light receiver within a housing, for emitting irradiation light from said light projector to a predetermined detecting direction outside said housing byway of projecting light optical path changing means and causing reflected light from an object in said detecting direction to be made incident on said light receiver by way of receiving light optical path changing means, so as to detect whether said object exists or not and a distance to said object;
 said apparatus comprising:
 a rotary mechanism having a rotating part installed so as to be rotatable about a predetermined axis within said housing as an axis of rotation and a rotary driving part for driving said rotating part, said projecting light optical path changing means and receiving light optical path changing means being secured and installed on said axis of rotation;
 angle detection means for detecting an angle of rotation of said rotating part; and
 a signal processing circuit for detecting the distance to said object according to a signal from said light projector and said light receiver and an angle to said object according to a signal from said angle detection means;
 a region within said housing being divided along the direction of said axis of rotation into an optical system region and a driving system region within which said light projector, said light receiver, and said signal processing circuit are disposed, a side wall of said optical system region being constituted by a transparent tube transparent to light;
 said optical system region being further divided along the direction of said axis of rotation into a light-projecting region, including said projecting light optical path changing means therein, for emitting said irradiation light into said detecting direction; and a light-receiving region adjacent said driving system region, including said receiving light optical path changing means therein, for receiving said reflected light from said detecting direction; said light-projecting region and said light-receiving region being optically separated from each other by light-shielding means, installed so as to be fixed with respect to said transparent tube, for blocking stray light deviating from an optical path;
 said light receiver having irradiation light guiding means, disposed on said axis of rotation so as to oppose said receiving light optical path changing means and installed within said light-projecting region, for guiding said irradiation light from said light projector to said projecting light optical path changing means.

4. An omnidirectional distance detecting apparatus, comprising a light projector and a light receiver within a housing, for emitting irradiation light from said light projector to a predetermined detecting direction outside said housing by way of projecting light optical path changing means and causing reflected light from an object in said detecting direction to be made incident on said light receiver by way of receiving light optical path changing means, so as to detect whether said object exists or not and a distance to said object;

said apparatus comprising:

a rotary mechanism having a rotating part installed so as to be rotatable about a predetermined axis within said housing as an axis of rotation and a rotary driving part for driving the rotating part, said projecting light optical path changing means and receiving light optical path changing means being secured and installed on said axis of rotation;

angle detection means for detecting an angle of rotation of said rotating part; and a signal processing circuit for detecting the distance to said object according to a signal from said light projector and said light receiver and an angle to said object according to a signal from said angle detection means;

a region within said housing being divided along the direction of said axis of rotation into an optical system region and a driving system region within which said light projector, said light receiver, and said signal processing circuit are disposed, a side wall of said optical system region being constituted by a transparent tube transparent to light;

said optical system region being further divided along the direction of said axis of rotation into a light-projecting region adjacent said driving system region, including said projecting light optical path changing means therein, for emitting said irradiation light into said detecting direction; and a light-receiving region, including said receiving light optical path changing means therein, for receiving said reflected light from said detecting direction; said light-projecting region and said light-receiving region being optically separated from each other by light-shielding means, installed so as to be fixed with respect to said transparent tube, for blocking stray light deviating from an optical path;

said light projector being disposed on said axis of rotation so as to oppose said projecting light optical path changing means; and said omnidirectional distance detecting apparatus having reflected light guiding means, installed within said light-receiving region, for guiding said reflected light from said receiving light optical path changing means to said light receiver.

5. An omnidirectional distance detecting apparatus according to claim 3, wherein said angle detection means comprises:

an angle detection disk, secured to an outer periphery of said rotating part, having an angle detection slit group constituted by a plurality of slits disposed at equally spaced intervals on a predetermined circle centered at said axis of rotation;

a photoelectric unit for photoelectrically detecting passage through said slits;

a clock circuit for generating an electric signal in a high-speed pulse form having a predetermined frequency; and angle calculating means for calculating the angle to the object by using the detection of slits obtained by said photoelectric unit and the number of pulses of electric signal caused by said clock circuit.

6. An omnidirectional distance detecting apparatus according to claim 4, wherein said angle detection means comprises:

an angle detection disk, secured to an outer periphery of said rotating part, having an angle detection slit group constituted by a plurality of slits disposed at equally spaced intervals on a predetermined circle centered at said axis of rotation;

a photoelectric unit for photoelectrically detecting passage through said slits;

a clock circuit for generating an electric signal in a high-speed pulse form having a predetermined frequency; and angle calculating means for calculating the angle to the object by using the detection of slits obtained by said photoelectric unit and the number of pulses of electric signal caused by said clock circuit.

* * * * *